(12) United States Patent
Nihei

(10) Patent No.: US 7,979,189 B2
(45) Date of Patent: Jul. 12, 2011

(54) VEHICLE BEHAVIOR CONTROL SYSTEM AND METHOD

(75) Inventor: Toshihisa Nihei, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 684 days.

(21) Appl. No.: 11/942,314

(22) Filed: Nov. 19, 2007

(65) Prior Publication Data

US 2008/0120003 A1 May 22, 2008

(30) Foreign Application Priority Data

Nov. 21, 2006 (JP) ................ 2006-314610

(51) Int. Cl.
*G06F 7/00* (2006.01)

(52) U.S. Cl. ............. 701/69; 701/82; 701/90; 180/197; 180/446

(58) Field of Classification Search ............... 701/69, 701/82, 90
See application file for complete search history.

(56) References Cited

U.S. PATENT DOCUMENTS

| | | | |
|---|---|---|---|
| 6,564,138 B1 * | 5/2003 | Schmitt et al. | 701/82 |
| 2005/0236894 A1 * | 10/2005 | Lu et al. | 303/139 |
| 2008/0120003 A1 * | 5/2008 | Nihei | 701/69 |

FOREIGN PATENT DOCUMENTS

| | | | |
|---|---|---|---|
| DE | 199 58 772 A1 | | 6/2001 |
| JP | 63-312275 | | 12/1988 |
| JP | 04365661 A | * | 12/1992 |
| JP | 6-24256 | | 2/1994 |
| JP | 8-142715 | | 6/1996 |
| JP | 9-24810 | | 1/1997 |
| JP | 09024810 A | * | 1/1997 |
| JP | 11-245678 | | 9/1999 |
| JP | 2001-219838 | | 8/2001 |
| JP | 2003-306135 | | 10/2003 |
| JP | 2006-103517 | | 4/2006 |
| JP | 2006-290024 | | 10/2006 |

* cited by examiner

*Primary Examiner* — Mark Hellner
*Assistant Examiner* — Redhwan Mawari
(74) *Attorney, Agent, or Firm* — Oblon, Spivak, McClelland, Maier & Neustadt, L.L.P.

(57) ABSTRACT

A vehicle behavior control system includes: a first drive power control unit that executes a turning control over right and left drive wheels of a vehicle to reduce the turning radius of the vehicle based on a drive power difference between the right and left drive wheels; a second drive power control unit that executes a traction control when any drive power difference between the right and left drive wheels exists, in order to reduce the existing drive power difference; and a traction control restriction unit that restricts the traction control from being executed when the turning control over the right and left drive wheels is executed.

6 Claims, 4 Drawing Sheets

VEHICLE BEHAVIOR CONTROL SYSTEM AND METHOD

INCORPORATION BY REFERENCE

The disclosure of Japanese Patent Application No. 2006-314610 filed on Nov. 21, 2006 including the specification, drawings and abstract is incorporated herein by reference in its entirety.

BACKGROUND OF THE INVENTION

1. Field of the Invention

The invention relates to a vehicle behavior control system and method that executes the turning radius reduction control and the traction control.

2. Description of the Related Art

The minimum turning radius of a vehicle is determined based on the characteristics of the vehicle such as the wheel base and the maximum steering angle. When a vehicle makes a U-turn or is turned into a narrow parking space, the vehicle is sometimes required to turn at a turning radius smaller than its minimum turning radius. In this case, the driver needs to perform extra vehicle operations, for example, turn the vehicle in a K-turn. Especially, when driving a vehicle having a long wheel base, for example, a mini-van, the driver needs to perform some annoying vehicle operations because the minimum turning radius of such a vehicle is large. Therefore, a system that reduces the turning radius of a vehicle to below its minimum turning radius, which is determined based on the characteristics of the vehicle, (hereinafter, such a system will be referred to as a "turning radius reduction system") has been developed. Such a system enables the vehicle to turn in a smaller radius. Japanese Patent Application Publication No. JP-2006-103517 descries a system that controls braking forces when a vehicle is turning, such that the braking force applied to inner wheels is larger than the braking force applied to outer wheels (especially, a great braking force is applied to the rear inner wheel), and controls drive power such that the vehicle speed is equal to or higher than a predetermined value.

Some rear drive vehicles include a traction control system in addition to the above-described turning radius reduction system. In the traction control, a braking force is applied to a drive wheel (rear wheel) in accordance with the degree of slip of the drive wheel with respect to that of a reference wheel, whereby spinning of the drive wheel is suppressed. The wheel turning at a low wheel speed is usually used as the reference wheel. If the turning radius reduction control is executed while the vehicle is turning, the wheel speed of the rear inner wheel becomes considerably lower than the wheel speeds of the other wheels, because the braking force is applied to the rear inner wheel by the turning radius reduction control and the turning radius of the inner wheel is smaller than that of the outer wheel. Accordingly, when the turning radius reduction control is executed, the rear inner wheel is used as the reference wheel and therefore the degree of the slip of the rear outer wheel is considerably high with respect to that of the reference wheel. Accordingly, even when the traction control need not be executed (even when the drive wheel is not actually spinning), the traction control may be executed and a braking force may be applied to the rear outer wheel. Therefore, a braking force is applied to the rear inner wheel by the turning radius reduction control and a braking force is applied to the rear outer wheel by the traction control. As a result, braking forces are applied to both the right and left drive wheels, which leads to deterioration in the driving performance of the vehicle.

SUMMARY OF THE INVENTION

The invention provides a vehicle behavior control system and method that execute a traction control in the optimum manner even when a turning radius reduction control is being executed.

A vehicle behavior control system according to a first aspect of the invention includes: a first drive power control unit that executes a turning control over right and left drive wheels of a vehicle based on a drive power difference between the right and left drive wheels to reduce a turning radius of the vehicle; a second drive power control unit that executes a traction control when any drive power difference between the right and left drive wheels exists, in order to reduce the existing drive power difference; and a traction control restriction unit that restricts the traction control from being executed when the turning control over the right and left drive wheels is executed.

A vehicle behavior control method according to a second aspect of the invention includes: determining whether a turning control over a right drive wheel and a left drive wheel of a vehicle is being executed based on a drive power difference between the right and left drive wheels; and restricting the traction control that reduces the drive power difference between the right and left drive wheels when it is determined that the turning control over the right and left drive wheels is being executed.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein.

DETAILED DESCRIPTION OF EMBODIMENTS

Hereafter, a vehicle behavior control system according to each embodiment of the invention will be described with reference to the accompanying drawings.

In each embodiment of the invention, a vehicle behavior control system according to the invention is mounted in a rear drive vehicle. The vehicle behavior control system according to each embodiment of the invention has at least the traction control function and the turning radius reduction control function. According to a first embodiment of the invention, the frequency at which the traction control is executed is made lower when the turning radius reduction control is being executed than when the regular control is executed. According to a second embodiment of the invention, the traction control is stopped when the turning radius reduction control is being executed. The traction control function of the vehicle behavior control system in each embodiment may be regarded as "second drive power control means" according to the invention. The turning radius reduction control function of the vehicle behavior control system in each embodiment may be regarded as a "first drive power control means" according to the invention.

Figure 1:
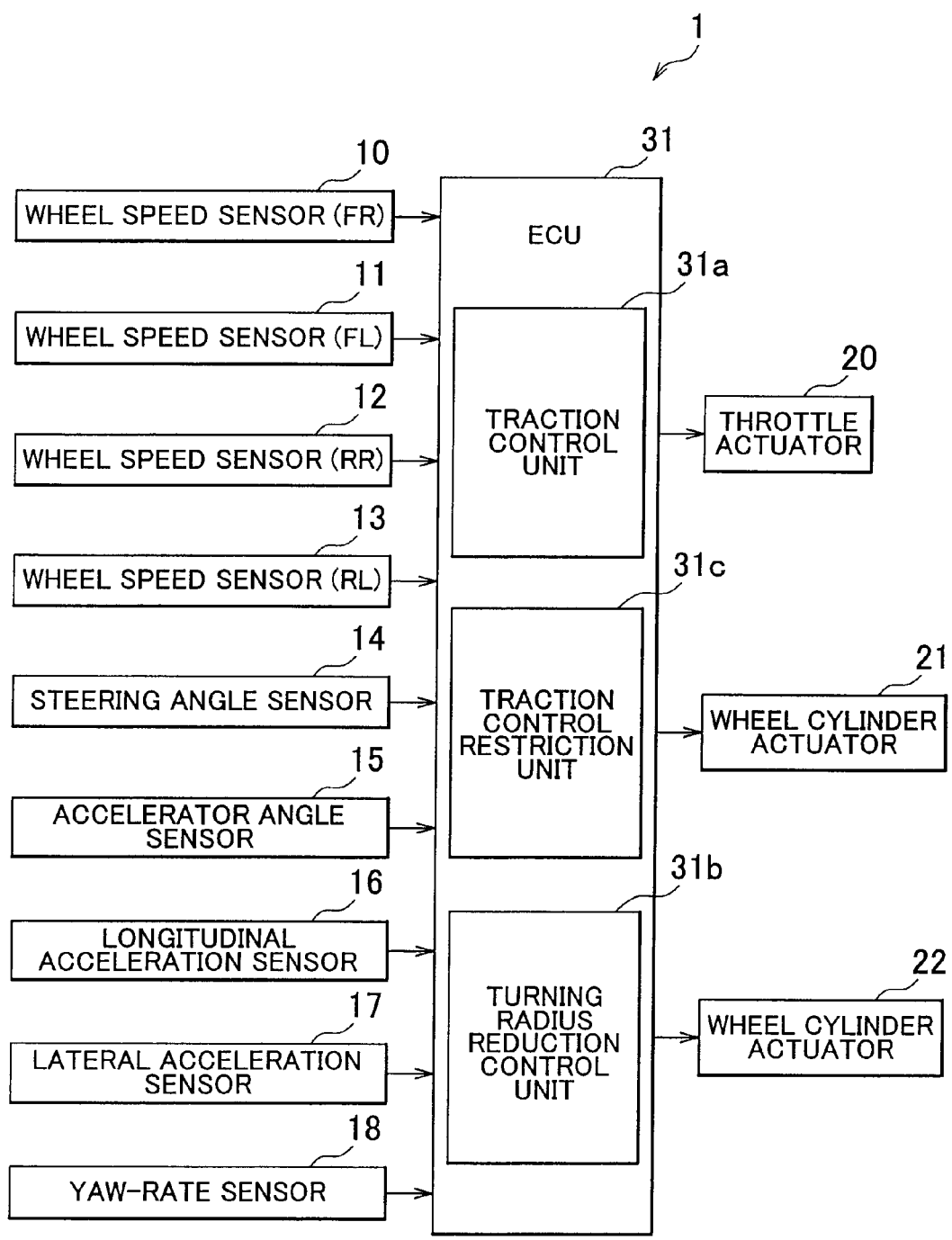
FIG. 1 is a view showing the configuration of a vehicle behavior control system according to each embodiment of the invention.
Figure 2:
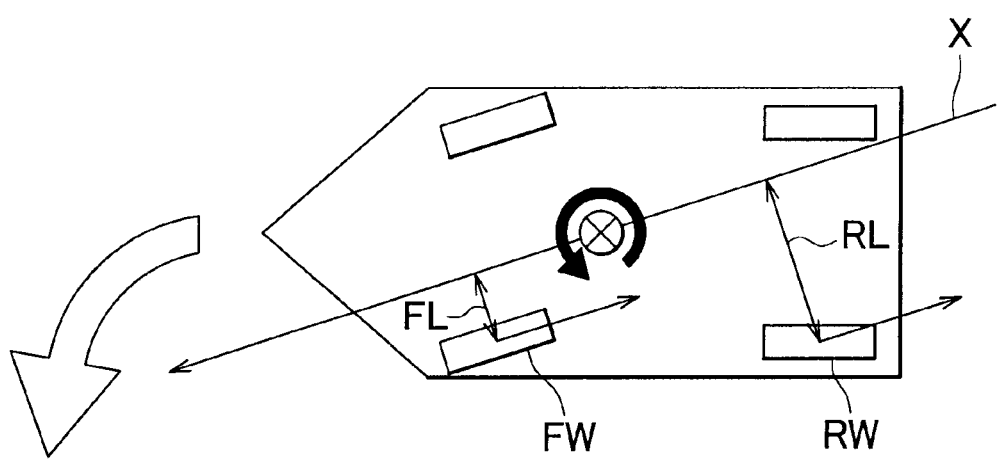
FIG. 2 a view illustrating the turning radius reduction control.

A vehicle behavior control system 1 according to the first embodiment of the invention will be described with reference to FIGS. 1 and 2. FIG. 1 is a view showing the configuration of the vehicle behavior control system according to each embodiment of the invention. FIG. 2 is a view illustrating the turning radius reduction control.

The vehicle behavior control system 1 applies a braking force to a spinning drive wheel and reduces a drive power supplied to this spinning drive wheel in order to efficiently transfer the drive power to the road surface by suppressing spinning of the wheel. When the vehicle is turning at a low speed and at a large steering angle, the vehicle behavior control system 1 applies a braking force to the rear inner wheel in order to reduce the turning radius. Thus, the vehicle is enabled to turn in a smaller radius. Especially, the vehicle behavior control system 1 makes the frequency, at which the traction control is executed, lower when the turning radius reduction control is being executed than when the regular control is being executed. With this control, the traction control is executed in the optimum manner even when the turning radius reduction control is being executed. Therefore, the vehicle behavior control system 1 includes wheel speed sensors 10, 11, 12 and 13, a steering angle sensor 14, an accelerator angle sensor 15, a longitudinal acceleration sensor 16, a lateral acceleration sensor 17, a yaw-rate sensor 18, a throttle actuator 20, a wheel cylinder actuators 21 and 22, and an ECU (Electronic Control Unit) 31.

The wheel speed sensors 10, 11, 12 and 13 are provided to the right front wheel, the left front wheel, the right rear wheel and the left rear wheel, respectively. The wheel speed sensors 10, 11, 12 and 13 detect the wheel speeds of the respective wheels, and transmit wheel speed signals indicating the detected wheel speeds to the ECU 31.

The steering angle sensor 14 is provided at a predetermined position in a steering mechanism that extends from the driver's steering wheel to the steering wheel. The steering angle sensor 14 detects the steering angle, and transmits a steering angle signal indicating the detected steering angle to the ECU 31.

The accelerator angle sensor 15 is provided to an accelerator pedal. The accelerator angle sensor 15 detects the accelerator angle, and transmits an accelerator angle signal indicating the detected accelerator angle to the ECU 31.

The longitudinal acceleration sensor 16 is provided at a predetermined position of a vehicle body. The longitudinal acceleration sensor 16 detects the longitudinal acceleration applied to the vehicle body, and transmits a longitudinal acceleration angle signal indicating the detected longitudinal acceleration to the ECU 31.

The lateral acceleration sensor 17 is provided at a predetermined position of the vehicle body. The lateral acceleration sensor 17 detects the lateral acceleration applied to the vehicle body, and transmits a signal indicating the detected lateral acceleration to the ECU 31.

The yaw-rate sensor 18 is provided at a predetermined position of the vehicle body. The yaw-rate sensor 18 detects the yaw-rate of the vehicle body, and transmits a yaw-rate signal indicating the detected yaw-rate to the ECU 31.

The actuator 20 is provided to a throttle valve, and adjusts the opening amount of throttle valve. When receiving a throttle control signal from the ECU 31, the throttle actuator 20 operates to change the opening amount of throttle valve according to the throttle control signal. A fuel injection device, instead of the throttle valve, may be controlled in order to adjust the drive power output from an engine.

The wheel cylinder actuators 21 and 22 are provided to the wheel cylinders of the right rear wheel and the left rear wheel, respectively, and adjust the hydraulic pressures in the respective wheel cylinders. When receiving braking pressure control signals from the ECU 31, the wheel cylinder actuators 21 and 22 operate to change the hydraulic pressures in the respective wheel cylinders according to the braking pressure control signals.

The ECU 31 is an electronic control unit that includes a CPU (Central Processing Unit), ROM (Read Only Memory), RAM (Random Access Memory), etc., and comprehensively controls the vehicle behavior control system 1. The ECU 31 receives detection signals from the above-described sensors 10 to 18 at predetermined time intervals. When the CPU executes the programs stored in the ROM, a traction control unit 31a, a turning radius reduction control unit 31b, and a traction control restriction unit 31c are implemented in the ECU 31. In the ECU 31, the traction control unit 31a, the turning radius reduction control unit 31b and the traction control restriction unit 31c execute the respective processes at predetermined time intervals based on the detection signals. The ECU 31 controls the throttle actuator 20 and the wheel cylinder actuators 21 and 22 on an as-needed basis.

The traction control function is implemented by the wheel speed sensors 10, 11, 12 and 13, the steering angle sensor 14, the accelerator angle sensor 15, the longitudinal acceleration sensor 16, the lateral acceleration sensor 17, the yaw-rate sensor 18, the throttle actuator 20, the wheel cylinder actuators 21 and 22, and the traction control unit 31a. The turning radius reduction control function is implemented by the wheel speed sensors 10, 11, 12 and 13, the steering angle sensor 14, the accelerator angle sensor 15, the wheel cylinder actuators 21 and 22, and the turning radius reduction control unit 31b.

The ECU 31 calculates the wheel speeds of the respective wheels based on wheel speed signals. The ECU 31 then calculates the vehicle body speed based on the wheel speeds of the four respective wheels.

The traction control unit 31a calculates the slip ratio of each of the right and left rear drive wheels based on the wheel speed of corresponding drive wheel and the wheel speed of the reference wheel. In this case, the wheel turning at the lowest wheel speed from among the four wheels is used as the reference wheel. The traction control unit 31a usually determines whether the slip ratio of each of the right and left drive wheels is equal to or higher than a traction control start threshold valve (base value). The traction control start threshold value is a slip ratio used to determine whether the drive wheel is spinning. The base value of the traction control start threshold value is obtained in advance, for example, through experiment. Especially, when the traction control start threshold value is changed by the traction control restriction unit 31c, the traction control unit 31a determines whether the slip ratio of each of the right and left drive wheels is equal to or higher than the post-change traction control start threshold value.

When it is determined that the slip ratio is equal to or higher than the traction control start threshold value (when the condition for executing the traction control is satisfied), the traction control unit 31a sets a target throttle opening amount for the drive wheel, of which the slip ratio is determined to be equal to or higher than the traction control start threshold value, based on the slip ratio of this drive wheel. The target throttle opening amount is used in the control for reducing the drive power output from the engine. Then, the traction control unit 31*a* sets a throttle control signal indicating the target throttle opening amount, and transmits the throttle control signal to the throttle actuator 20. The target throttle opening amount is set to a smaller value as the slip ratio becomes higher. The target throttle opening amount is set using, for example, a map that indicates the relationship between the target throttle opening amount and the slip ratio. The traction control unit 31*a* sets a target pressure application amount for the drive wheel, of which the slip ratio is determined to be equal to or higher than the traction control start threshold value, based on the slip ratio of this drive wheel. The target pressure application amount is used in the control for applying a braking force to the drive wheel. Then, the traction control unit 31*a* sets a braking pressure control signal indicating the target pressure application amount, and transmits the braking pressure control signal to the wheel cylinder actuator. The target pressure application amount is set to a larger value as the slip ratio becomes higher. The target pressure application amount is set using, for example, a map that indicates the relationship between the target pressure application amount and the slip ratio.

The basic control that is executed using the wheel speed has been described as the traction control. However, more complicated control may be executed using the steering angle, the accelerator angle, the longitudinal acceleration, the lateral acceleration, and the yaw-rate, in addition to the wheel speed.

The turning radius reduction control unit 31*b* determines whether the vehicle is moving and the vehicle body speed is equal to or lower than a predetermined vehicle speed at which the turning radius reduction control is started. The predetermined vehicle speed is set to a low vehicle speed used to determine whether the vehicle is moving at a low speed. The predetermined vehicle speed is set in advance with, for example, a vehicle speed during a U-turn or a parking operation taken into account. When it is determined that the vehicle is moving and the vehicle body speed is equal to or lower than the predetermined vehicle speed, the turning radius reduction control unit 31*b* then determines whether the steering angle is equal to or larger than a predetermined steering angle at which the turning radius reduction control is started. The predetermined steering angle is set to a large steering angle used to determine whether the steering angle is close to the maximum steering angle. The predetermined steering angle is set in advance based on, for example, the maximum steering angle of the vehicle.

When it is determined that the vehicle is moving, the vehicle body speed is equal to or lower than the predetermined vehicle speed, and the steering angle is equal to or larger than the predetermined steering angle (i.e., when the condition for executing the turning radius reduction control is satisfied), the turning radius reduction control unit 31*b* sets a target pressure application amount for the rear inner wheel based on the accelerator angle. The target pressure application amount is used in the control for applying a braking force to the rear inner wheel. Then, the turning radius reduction control unit 31*b* sets a braking pressure control signal indicating the target pressure application amount, and transmits the braking pressure control signal to the wheel cylinder actuator. The target pressure application amount is set to a larger value as the accelerator angle becomes larger. The target pressure application amount is set using, for example, a map that indicates the relationship between the target pressure application amount and the accelerator angle. The target pressure application amount is set based on the accelerator angle for the following reason. A braking force is actively applied to the rear inner wheel based on a determination made on the vehicle side. In order to suppress discomfort caused by this braking force, the braking force is made smaller as the drive power becomes smaller. The target pressure application amount may be set with the steering angle, in addition to the accelerator angle, taken into account.

The reason why a braking force is applied to the rear inner wheel will be described below. When the vehicle is turning at a low speed and at a large steering angle, if a braking force is applied to the rear inner wheel, a turning moment that causes the vehicle to turn is produced. The arm length FL of the front inner wheel FW and the arm length RL of the rear inner wheel RW are brought into the condition shown in FIG. 2 due to this turning moment. The arm length is the length between the center axis X (the axis that indicates the traveling direction of the gravity center of the vehicle) and each wheel. As the arm length increases, the turning performance of the vehicle improves. As shown in FIG. 2, the arm length RL of the rear inner wheel RL is longer than the arm length FL of the front inner wheel FW. That is, the turning performance of the vehicle improves more significantly and the minimum turning radius is reduced by a larger amount when a braking force is applied to the rear inner wheel RW than when a braking force is applied to the front inner wheel FW. Note that, even when a braking force is applied to the front inner wheel FW, the turning performance of the vehicle somewhat improves. Accordingly, a braking force may be applied also to the front inner wheel FW.

The traction control restriction unit 31*c* determines whether the turning radius reduction control is being executed (i.e., whether the condition for executing the turning radius reduction control is satisfied). When it is determined that the turning radius reduction control is being executed, the traction control restriction unit 31*c* changes the traction control start threshold value to a value higher than the base value based on the amount of pressure applied to the wheel cylinder of the rear inner wheel such that the traction control is executed less frequently. The traction control start threshold value is changed to a higher slip ratio, as the amount of pressure applied to the wheel cylinder of the rear inner wheel becomes larger (i.e., as the braking force applied to the rear inner wheel becomes larger). The traction control start threshold value is changed to a higher value using, for example, a map that indicates the relationship between the traction control start threshold value and the pressure application amount. The amount of pressure applied to the wheel cylinder of the rear inner wheel may be the target pressure application amount set by the turning radius reduction control unit 31*b*, or the actual pressure application amount determined based on the wheel cylinder pressure detected by the sensor.

The reason why the traction control start threshold value is changed to a higher value when the turning radius reduction control is being executed will be described below. When the turning radius reduction control is being executed, a braking force is applied to the rear inner wheel. Accordingly, the wheel speed of the rear inner wheel is considerably lower than the wheel speeds of the other wheels. Therefore, when the turning radius reduction control is executed, the rear inner wheel is used as the reference wheel when the traction control unit 31*a* obtains the slip ratios of the respective wheels. Therefore, the slip ratio of the rear outer wheel is high, and the traction control is executed more frequently when the turning radius reduction control is being executed than when the regular control is being executed. Accordingly, even when the rear outer wheel is not actually spinning, the traction control may be executed and a braking force may be applied to the rear outer wheel. Therefore, when the turning radius reduction control is being executed, the traction control restriction unit 31c changes the traction control start threshold value to a value higher than that used during the regular control, whereby the traction control is not executed. However, there is a possibility that the rear outer wheel is actually spinning. Accordingly, when the slip ratio of the rear outer wheel becomes equal to or higher than the post-change traction control start threshold value set by the traction control restriction unit 31c, the traction control is executed to apply a braking force to the rear outer wheel.

In this case, braking forces are applied to both the right and left drive wheels, resulting in deterioration in the driving performance of the vehicle. Accordingly, the traction control unit 31a may make a braking force applied to the rear outer wheel (for example, the target pressure application amount) smaller when the turning radius reduction control is being executed than when the regular control is being executed.

Figure 3:
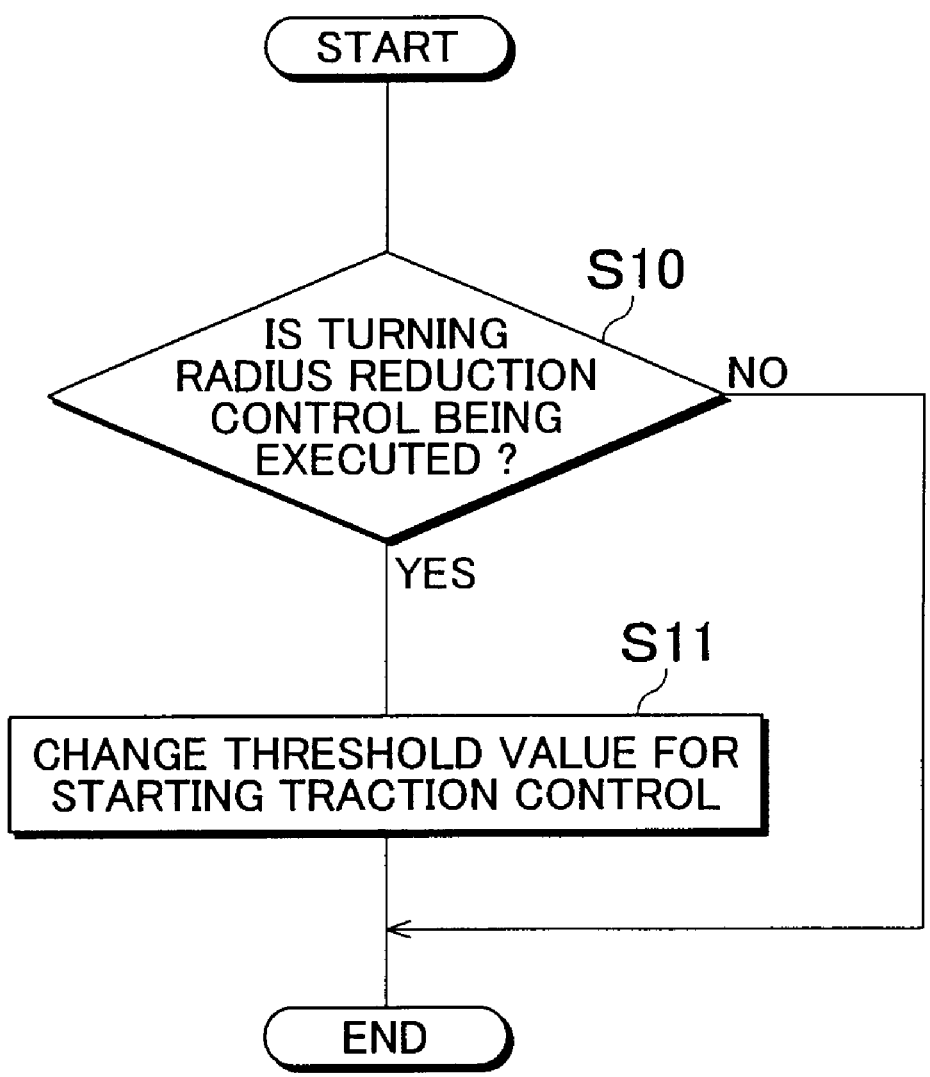
FIG. 3 is a flowchart showing the routine executed by a traction control restriction unit of an ECU according to a first embodiment of the invention.

The operation of the vehicle behavior control system 1 when the vehicle that has been stopped in the intersection starts making a U-turn will be described with reference to FIG. 1. The routine performed by the traction control restriction unit 31c of the ECU 31 will be described with reference to the flowchart in FIG. 3. FIG. 3 is the flowchart showing the routine executed by the traction control restriction unit 31c of the ECU 31 according to the first embodiment of the invention.

The wheel speed sensors 10, 11, 12 and 13 detect the wheel speeds of the respective wheels, and transmit wheel speed signals to the ECU 31. The steering angle sensor 14 detects the steering angle, and transmits a steering angle signal to the ECU 31. The accelerator angle sensor 15 detects the accelerator angle, and transmits an accelerator angle signal to the ECU 31. The longitudinal acceleration sensor 16 detects the longitudinal acceleration, and transmits a longitudinal acceleration signal to the ECU 31. The lateral acceleration sensor 17 detects the lateral acceleration, and transmits a lateral acceleration signal to the ECU 31. The yaw-rate sensor 18 detects the yaw-rate, and transmits a yaw-rate signal to the ECU 31.

The ECU 31 receives the detection signals from the sensors 10 to 18 at predetermined time intervals. The ECU 31 calculates the wheel speeds of the respective wheels, and then calculates the vehicle body speed based on the wheel speeds of the respective wheels.

The turning radius reduction control unit 31b of the ECU 31 determines whether the vehicle is moving, the vehicle body speed is equal to or lower than the predetermined vehicle speed, and the steering angle is equal to or larger than the predetermined steering angle at predetermined time intervals. When the vehicle has been stopped in the intersection to wait for an oncoming vehicle to pass, the turning radius reduction control unit 31b determines that the vehicle has been stopped, and does not start the turning radius reduction control.

After the oncoming vehicle passes by the vehicle, the vehicle starts making a U-turn, and moves in the turning direction at a low speed and at a large steering angle. Then, the turning radius reduction control unit 31b determines that the vehicle is moving, the vehicle body speed is equal to or lower than the predetermined vehicle speed, and the steering angle is equal to or larger than the predetermined steering angle, and then starts the turning radius reduction control. The turning radius reduction control unit 31b sets a braking pressure control signal for the rear inner wheel based on the accelerator angle, and transmits the braking pressure control signal to the wheel cylinder actuator 21. The wheel cylinder actuator 21 of the rear inner wheel operates according to the braking pressure control signal, and increases the hydraulic pressure in the wheel cylinder. Thus, a braking force is applied to the rear inner wheel, and a turning moment that causes the vehicle to make a U-turn is produced. As a result, the minimum turning radius of the vehicle is reduced during the U-turn. Because a braking force is applied to the rear inner wheel, the wheel speed of the rear inner wheel is lower than the wheel speed of the rear outer wheel.

The traction control restriction unit 31c of the ECU 31 determines whether the turning radius reduction control is being executed as shown in FIG. 3 at predetermined time intervals (S10). When the vehicle has been stopped in the intersection, the traction control restriction unit 31c determines in S10 that the turning radius reduction control is not being executed, and ends the current routine. On the other hand, when the vehicle starts making a U-turn, the traction control restriction unit 31c determines that the turning radius reduction control is being executed, and changes the traction control start threshold value to a value (namely, a value higher than the base value), based on which the traction control is executed less frequently, in accordance with the amount of pressure applied to the wheel cylinder of the rear inner wheel (S11).

At predetermined time intervals, the traction control unit 31a of the ECU 31 calculates the slip ratio of each drive wheel based on the wheel speed, and determines whether the slip ratio is equal to or higher than the traction control start threshold value. At this time, the base value is used as the traction control start threshold value, when the turning radius reduction control is not being executed. When the turning radius reduction control is being executed, the post-change value set by the traction control restriction unit 31c is used as the traction control start threshold value.

When it is determined that the slip ratio is lower than the traction control start threshold value, the traction control unit 31a does not start the traction control. On the other hand, when it is determined that the slip ratio is equal to or higher than the traction control start threshold value, the traction control unit 31a executes the traction control, and sets a throttle control signal for the drive wheel, of which the slip ratio is determined to be equal to or higher than the traction control start threshold value, based on the slip ratio of this drive wheel. Then, the traction control unit 31a transmits the throttle control signal to the throttle actuator 20, sets a brake pressure control signal based on the slip ratio, and transmits the braking pressure control signal to the wheel cylinder actuator. The throttle actuator 20 operates based on the throttle control signal, and reduces the opening amount of throttle valve. Thus, the drive power output from the engine is reduced, and therefore the drive power supplied to the vehicle is reduced. The wheel cylinder actuator for the spinning drive wheel operates based on the braking pressure control signal to increase the hydraulic pressure in the wheel cylinder. Thus, a braking force is applied to the spinning drive wheel. As a result, spinning of this drive wheel is suppressed.

Especially, when the turning radius control is being executed, the wheel speed of the rear inner wheel is considerably lower than the wheel speed of the rear outer wheel, because a braking force is applied to the rear inner wheel and the turning radius of the rear inner wheel is smaller than the turning radius of the rear outer wheel. Accordingly, the slip ratio of the rear outer wheel is higher than that during the regular traction control. However, the traction control start threshold value is changed to a value higher than that in the regular traction control. Accordingly, unless the rear outer wheel actually spins and the slip ratio of the rear outer wheel becomes considerably high, the slip ratio of the rear outer wheel does not become equal to or higher than the traction control start threshold value and the traction control is not started. Therefore, occurrence of the situation in which braking forces are applied to both the right and left drive wheels is minimized, and the vehicle is able to make a U-turn at a small turning radius.

With the vehicle behavior control system 1, when the turning radius reduction control is being executed, the traction control start threshold value is changed to a value based on which the traction control is executed less frequently. As a result, execution of unnecessary traction control when the drive wheel is not actually spinning is suppressed. Note that, when the drive wheel is actually spinning, the traction control is executed as necessary. Therefore, even when the turning radius reduction control is being executed, the traction control is executed in the optimum manner. Thus, conflict between the turning radius reduction control and the traction control is effectively suppressed, and therefore reduction in the driving performance of the vehicle is suppressed.

Hereafter, a vehicle behavior control system 1 according to a second embodiment of the invention will be described with reference to FIG. 1. The same components as those of the vehicle behavior control system 1 according to the first embodiment of the invention will be denoted by the same reference numerals, and the description thereof will not be provided below.

The vehicle behavior control system 1 according to the second embodiment of the invention differs from the vehicle behavior control system 1 according to the first embodiment of the invention only in the frequency at which the traction control is executed during the turning radius reduction control. The vehicle behavior control system 1 according to the second embodiment of the invention stops the traction control during the turning radius reduction control such that conflict between the turning radius reduction control and the traction control is prevented. Accordingly, the vehicle behavior control system 1 according to the second embodiment of the invention differs from the vehicle behavior control system 1 according to the first embodiment of the invention only in control executed by the ECU 31.

As in the ECU 31 according to the first embodiment of the invention, in the ECU 31 according to the second embodiment of the invention, the traction control unit 31a, the turning radius reduction control unit 31b, and the traction control restriction unit 31c are implemented. However, the traction control unit 31a and the traction control restriction unit 31c according to the second embodiment of the invention execute controls that are different from the controls executed by the traction control unit 31a and the traction control restriction unit 31c according to the first embodiment of the invention. Therefore, only the traction control unit 31a and the traction control restriction unit 31c according to the second embodiment of the invention will be described below.

The traction control restriction unit 31c determines whether the turning radius reduction control is being executed. When it is determined that the turning radius reduction control is being executed, the traction control restriction unit 31c stops the control executed by the traction control unit 31a. The traction control is stopped when the turning radius reduction control is being executed is for the following reason. As described above, when the turning radius reduction control is being executed, the slip ratio of the rear outer wheel becomes high, and the frequency at which the traction control is executed is higher than when the regular control is being executed. Accordingly, even when the rear outer wheel is not actually spinning, the traction control may be executed. Therefore, the traction control is stopped when the turning radius reduction control is being executed, whereby occurrence of the situation in which braking forces are applied to both the right and left drive wheels is minimized.

When the traction control is stopped by the traction control restriction unit 31c, the traction control unit 31a does not execute any controls included in the traction control. When the traction control is not stopped by the traction control restriction unit 31c, the traction control unit 31a executes the regular traction control. In this case, only the base value is used, because the traction control start threshold value is not changed. Instead of stopping all the controls included in the traction control, only the throttle control and the wheel cylinder pressure control included in the traction control may be stopped when the traction control is stopped by the traction control restriction unit 31c.

Figure 4:
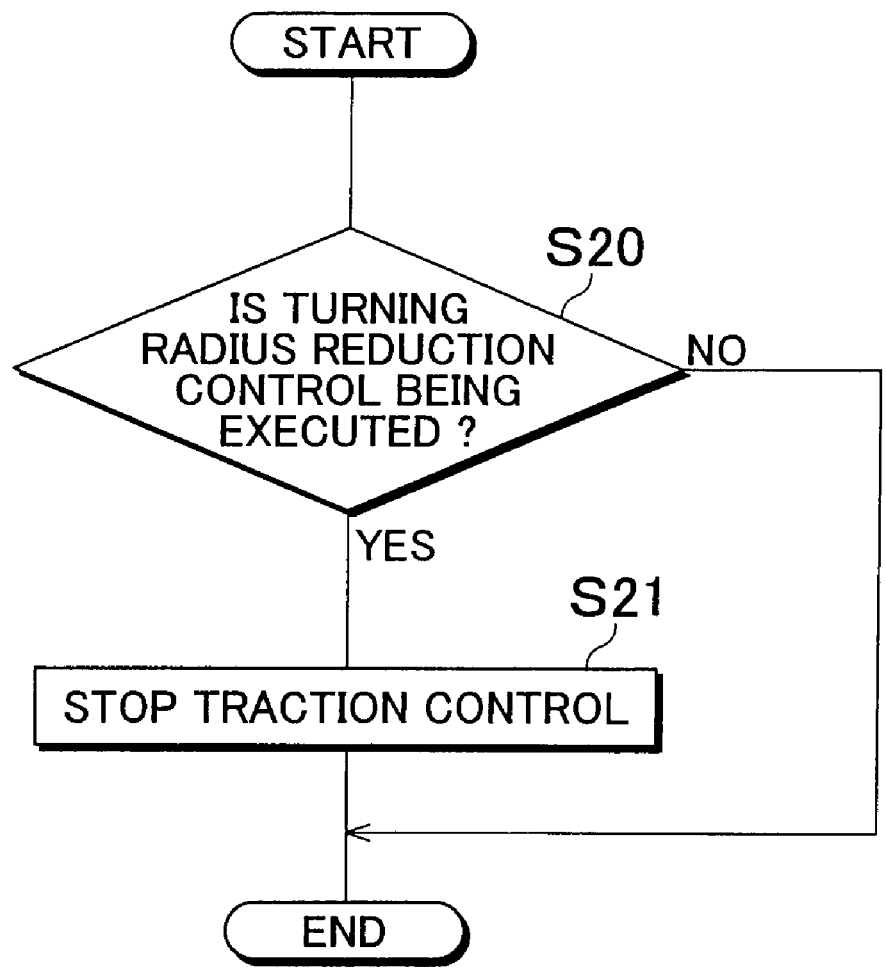
FIG. 4 is a flowchart showing the routine executed by a traction control restriction unit of the ECU according a second embodiment of the invention.

Hereafter, the operation of the vehicle behavior control system 1 according to the second embodiment of the invention when the vehicle that has been stopped in the intersection starts making a U-turn will be described, as in the first embodiment of the invention. Especially, the routine executed by the traction control restriction unit 31c of the ECU 31 will be described with reference to the flowchart in FIG. 4. FIG. 4 is the flowchart showing the routine executed by the traction control restriction unit 31c of the ECU 31 according to the second embodiment of the invention.

In the vehicle behavior control system 1 according to the second embodiment of the invention, the sensors 10 to 18 and the turning radius reduction control unit 31b of the ECU 31 perform the same operations as those in the first embodiment of the invention. Accordingly, the operations of these components will not be described below.

The traction control restriction unit 31c of the ECU 31 determines whether the turning radius reduction control is being executed as shown in FIG. 4 at predetermined time intervals (S20). When the vehicle has been stopped in the intersection, the traction control restriction unit 31c determines in S20 that the turning radius reduction control is not being executed, and ends the current routine. When the vehicle starts making a U-turn, the traction control restriction unit 31c determines in S20 that the turning radius reduction control is being executed, and stops the traction control (S21).

When the traction control is stopped by the traction control restriction unit 31c, the traction control unit 31a of the ECU 31 does not execute the traction control. When the traction control is not stopped by the traction control restriction unit 31c, the traction control unit 31a executes the regular traction control.

Accordingly, when the turning radius reduction control is started, although the slip ratio of the rear outer wheel increases, the traction control is not executed. Therefore, occurrence of the situation in which braking forces are applied to both the right and left drive wheels is minimized, and therefore the vehicle is able to make a smooth U-turn at a small turning radius.

With the vehicle behavior control system 1, the traction control is stopped when the turning radius reduction control is being executed. Thus, unnecessary execution of the traction control when the drive wheel is not spinning is prevented. Thus, conflict between the turning radius reduction control and the traction control is prevented, and therefore deterioration in the driving performance of the vehicle is suppressed.

While the embodiments of the invention have been described, the invention is not limited to the above-described embodiments and may be implemented in various other embodiments.

For example, each embodiment of the invention described above is applied to a rear drive vehicle. Alternatively, the invention may be applied to a four-wheel drive vehicle and a front-wheel drive vehicle.

Each embodiment of the invention described above is applied to the traction control in which the brake control for the drive wheel and the engine control (throttle control) are executed. Alternatively, the invention may be applied to the traction control in which one of the brake control and the engine control is executed.

Each embodiment of the invention described above is applied to the turning radius reduction control in which a braking force is applied to the rear inner wheel. Alternatively, the invention may be applied to the turning radius reduction control in which a braking force is applied to the front inner wheel.

In each embodiment of the invention, the traction control, the turning radius reduction control and the coordination between the traction control and the turning radius reduction control are all executed by a single ECU. Alternatively, the traction control, the turning radius reduction control and the coordination between the traction control and the turning radius reduction control may be executed by different ECUs.

According to one of the embodiments of the invention, the frequency at which the traction control is executed is made lower when the turning radius reduction control is being executed than when the regular control is being executed. According to the other embodiment of the invention, the traction control is stopped when the turning radius reduction control is being executed. Alternatively, in order to restrict the traction control, the amount of braking force applied to the drive wheel by the traction control or the amount of reduction in the drive power due to the traction control may be made smaller when the turning radius reduction control is being executed than when the regular control is being executed.

According to one of the embodiments of the invention, the frequency at which the traction control is executed is made lower when the turning radius reduction control is being executed than when the regular control is being executed. According to the other embodiment of the invention, the traction control is stopped while the turning radius reduction control is being executed. Alternatively, the traction control start threshold value may be changed to a value based on which the traction control is executed less frequently or the traction control may be stopped, at the same time that the turning radius reduction control is started.

According to the first embodiment of the invention, the traction control start threshold value is changed based on the amount of pressure applied to the wheel cylinder. Alternatively, the traction control start threshold value may be changed by a predetermined amount, or changed based on a parameter other than the pressure application amount.

While the invention has been described with reference to the embodiments thereof, it is to be understood that the invention is not limited to the described embodiments or constructions. To the contrary, the invention is intended to cover various modifications and equivalent arrangements. In addition, while the various elements of the example embodiments are shown in various combinations and single element, are also within the spirit and scope of the invention.

What is claimed is:

1. A vehicle behavior control system, comprising:
   a first drive power control unit that executes a turning control to reduce a turning radius of a vehicle using a drive power difference, which is a difference between a drive power supplied to a right drive wheel and a drive power supplied to a left drive wheel, so that the vehicle is enabled to turn in a smaller radius; and
   a second drive power control unit that executes a traction control when there is a drive power difference between the right drive wheel and the left drive wheel, in order to reduce the drive power difference, wherein
   when a vehicle speed is equal to or lower than a predetermined vehicle speed and a steering angle is equal to or larger than a predetermined steering angle, the first drive power control unit applies a braking force to an inner wheel in the turning control,
   the second drive power control unit determines whether there is a drive power difference between the right drive wheel and the left drive wheel using a wheel that turns at a lower wheel speed as a reference wheel,
   when the turning control is executed by the first drive power control unit, the traction control executed by the second drive power control unit is restricted by changing a threshold value, at which the second drive power control unit starts the traction control, to a value based on which the traction control is executed less frequently,
   the second drive power control unit calculates a slip ratio of each of the right drive wheel and the left drive wheel based on a corresponding wheel speed and a speed of the reference wheel,
   a first slip ratio of each of the right drive wheel and the left drive wheel is a slip ratio at which traction control is executed when the turning control is not being executed,
   a second slip ratio of each of the right drive wheel and the left drive wheel is higher than the first slip ratio, and
   the second slip ratio is a ratio at which traction control is executed when turning control is being executed.

2. The vehicle behavior control system according to claim 1, wherein
   the threshold value, at which the second drive power control unit starts the traction control, is changed to a value based on which the traction control is executed further less frequently, as the drive power difference between the right drive wheel and the left drive wheel, which is used in the turning control executed by the first drive power control unit, increases.

3. The vehicle behavior control system according to claim 1, wherein
   the first drive power control unit sets the drive power difference between the right drive wheel and the left drive wheel based on at least one of an operation amount of an accelerator pedal and the steering angle.

4. The vehicle behavior control system according to claim 1, wherein
   when the traction control over the outer wheel is executed by the second drive power control unit while the first drive power control unit executes the turning control, a braking force that is applied to the outer wheel by the second drive power control unit is made smaller than when the traction control is executed without executing the turning control.

5. A vehicle behavior control system according to claim 1, further comprising an accelerator angle sensor provided to an accelerator pedal that detects an accelerator angle, wherein the first drive power control unit applies the braking force to the inner wheel during the turning control based on the accelerator angle.

6. A vehicle behavior control system according to claim 1, wherein the threshold value, at which the second drive power control unit starts the traction control, is higher than a base value which is based on an amount of braking pressure applied to the inner wheel such that the traction control is executed less frequently.

* * * * *